(12) United States Patent
Hepworth et al.

(10) Patent No.: US 7,457,862 B2
(45) Date of Patent: Nov. 25, 2008

(54) REAL TIME CONTROL PROTOCOL SESSION MATCHING

(75) Inventors: Neil Hepworth, Artarmon (AU);
Alastair J. Rankine, Boulder, CO (US)

(73) Assignee: Avaya, Inc., Basking Ridge, NJ (US)

( * ) Notice: Subject to any disclaimer, the term of this patent is extended or adjusted under 35 U.S.C. 154(b) by 1170 days.

(21) Appl. No.: 10/028,874

(22) Filed: Oct. 22, 2001

(65) Prior Publication Data
US 2003/0120789 A1    Jun. 26, 2003

(51) Int. Cl.
  *G06F 15/173*  (2006.01)
(52) U.S. Cl. .................. 709/224; 709/230; 709/238; 709/227; 709/245; 709/228
(58) Field of Classification Search .......... 709/224, 709/230, 238, 227, 245, 228
See application file for complete search history.

(56) References Cited

U.S. PATENT DOCUMENTS

| | | | |
|---|---|---|---|
| 4,791,660 A | 12/1988 | Oye et al. | |
| 5,067,127 A | 11/1991 | Ochiai | |
| 5,206,903 A | 4/1993 | Kohler et al. | |
| 5,506,872 A | 4/1996 | Mohler | |
| 5,594,740 A | 1/1997 | LaDue | |
| 5,828,747 A | 10/1998 | Fisher et al. | |
| 5,905,793 A | 5/1999 | Flockhart et al. | |
| 5,933,425 A | 8/1999 | Iwata | |
| 5,946,618 A | 8/1999 | Agre et al. | |
| 5,953,312 A | 9/1999 | Crawley et al. | |
| 5,961,572 A | 10/1999 | Craport et al. | |
| 5,982,873 A | 11/1999 | Flockhart et al. | |
| 6,038,214 A | 3/2000 | Shionozaki | |
| 6,067,300 A * | 5/2000 | Baumert et al. ............. | 370/413 |
| 6,073,013 A | 6/2000 | Agre et al. | |
| 6,088,732 A | 7/2000 | Smith et al. | |
| 6,122,665 A * | 9/2000 | Bar et al. .................... | 709/224 |
| 6,163,607 A | 12/2000 | Bogart et al. | |
| 6,173,053 B1 | 1/2001 | Bogart et al. | |

(Continued)

FOREIGN PATENT DOCUMENTS

WO    WO 91/14278    9/1991

(Continued)

OTHER PUBLICATIONS

Application Note, Emergency 911 In Packet Networks, http:www.fastcomm.com/NewWeb/solutions/e911.html, Sep. 5, 2001, FastComm Communications Corporation, 3 pgs.

(Continued)

*Primary Examiner*—Kenny S Lin
*Assistant Examiner*—Lan-Dai T Truong
(74) *Attorney, Agent, or Firm*—Sheridan Ross P.C.

(57) ABSTRACT

The present invention is directed generally to a system and method for monitoring a multi-party session. The system and method includes in one embodiment a matcher to match selected information in incoming RTCP packets with one or more of an orphan table and active session table and in another embodiment a first session endpoint that reflects or transmits a packet received from a second session endpoint to a session monitor. In yet another embodiment, the network address of the first and second endpoints can be included in the packet.

24 Claims, 4 Drawing Sheets

U.S. PATENT DOCUMENTS

| | | | |
|---|---|---|---|
| 6,192,122 | B1 | 2/2001 | Flockhart et al. |
| 6,256,300 | B1 | 7/2001 | Ahmed et al. |
| 6,381,639 | B1 | 4/2002 | Thebaut et al. |
| 6,463,470 | B1 | 10/2002 | Mohaban et al. |
| 6,463,474 | B1* | 10/2002 | Fuh et al. ............... 709/225 |
| 6,502,131 | B1 | 12/2002 | Vald et al. |
| 6,529,475 | B1* | 3/2003 | Wan et al. ............... 370/231 |
| 6,529,499 | B1 | 3/2003 | Doshi et al. |
| 6,532,241 | B1* | 3/2003 | Ferguson et al. ............ 370/469 |
| 6,578,077 | B1 | 6/2003 | Rakoshitz et al. |
| 6,601,101 | B1* | 7/2003 | Lee et al. ............... 709/227 |
| 6,754,710 | B1* | 6/2004 | McAlear ............... 709/227 |
| 6,760,312 | B1 | 7/2004 | Hitzeman |
| 6,765,905 | B2 | 7/2004 | Gross et al. |
| 6,778,534 | B1* | 8/2004 | Tal et al. ............... 370/392 |
| 6,798,751 | B1* | 9/2004 | Voit et al. ............... 370/252 |
| 6,857,020 | B1 | 2/2005 | Chaar et al. |
| 6,954,435 | B2 | 10/2005 | Billhartz et al. |
| 6,973,033 | B1 | 12/2005 | Chiu et al. |
| 6,988,133 | B1 | 1/2006 | Zavalkovsky et al. |
| 2001/0037406 | A1* | 11/2001 | Philbrick et al. ............ 709/250 |
| 2001/0039210 | A1 | 11/2001 | ST-Denis |
| 2002/0073232 | A1* | 6/2002 | Hong et al. ............... 709/238 |
| 2002/0091844 | A1* | 7/2002 | Craft et al. ............... 709/230 |
| 2002/0105911 | A1* | 8/2002 | Pruthi et al. ............... 370/241 |
| 2002/0176404 | A1 | 11/2002 | Girard |
| 2003/0016653 | A1* | 1/2003 | Davis ............... 370/351 |

FOREIGN PATENT DOCUMENTS

| | | |
|---|---|---|
| WO | WO 98/46035 | 10/1998 |
| WO | WO 99/51038 | 10/1999 |
| WO | WO 00/41090 | 7/2000 |
| WO | WO 01/26393 | 4/2001 |
| WO | WO 01/75705 | 10/2001 |
| WO | WO 02/00316 | 1/2002 |

OTHER PUBLICATIONS

Benjamin W. Wah, et al., "A Survey of Error-Concealment Schemes for Real-Time Audio and Video Transmissions over the Internet," Department of Electrical and Computer Engineering and the Coordinate Science Laboratory, University of Illinois at Urbana-Champaign, Proc. IEEE Int'l Symposium on Multimedia Software Engineering, Dec. 2000.

Bernet et al., "Specification of the Null Service Type", RFC 2997, Nov. 2000, 12 pages.

Bernet, "Format of the RSVP DCLASS Object", RFC 2996, Nov. 2000, 9 pages.

Berney et al., "A Framework for Integrated Services Operation over Diffserv Networks", RFC 2998, Nov. 2000, 29 pages.

Braden et al. "Resource ReSerVation Protocol (RSVP)", RFC 2205, Sep. 1997, 6 pages.

Brown, I. Internet Engineering Task Force, Securing Prioritised Emergency Traffic, http://www.lepscheme.net/docs/draft-brown-ieps-sec-00.txt, Jul. 5, 2001, pp. 1-12.

Carlberg, Ken. Internet Engineering Task Force, Framework for Supporting IEPS in IP Telephony, http://ww.iepscheme.net/docs/draft-carlberg-ieps-framework-01.tex, Jul. 4, 2001, pp. 1-24.

Chan et al., "COPS Usage for Policy Provisioning (COPS-PR)", RFC 3084, Mar. 2001, 32 pages.

Cisco Systems, "Cisco Emergency Responder Version 1.1 Data Sheet" (Oct. 2001), 5 pages, copyright 1992-2001.

Ejaz Mahfuz; "Packet Loss Concealment for Voice Transmission Over IP Networks" (2001) (Master thesis, Department of Electrical Engineering, McGill University) (on file with author).

Floyd et al., "Random Early Detection Gateways for Congestion Avoidance", IEEE/ACM Transaction on Networking, Aug. 1993, 22 pages.

Getting Started with the Cisco IP Phone 7960/7940, pp. 1-1 to 1-4; undated.

Government Emergency Telecommunications Service (GETS), "White Paper on IP Teleponhy A Roadmap to Supporting GETS in IP Networks," Apr. 27, 2000, Science Applications International Corporation, pp. 1-32.

Grigonis, Computer Telephony Encyclopedia, pp. 268-277 (2000).

Handley et al., "SIP: Session Initiation Protocol", RFC 2543, Mar. 1999, 81 pages.

Herzog et al., "COPS Usage for RSVP", RFC 2749, Jan. 2000, 16 pages.

Huai-Rong Shao et al., "A New Framework for Adaptive Multimedia over the Next Generation Internet," Microsoft Research China; undated.

IEEE Standards for Information Technology—Telecommunications and information exchange between systems—Local and metropolitan area networks—Common specifications—Part 3: Media Access Control (MAC) Bridges, LAN/MAN Standards Committee of the IEEE Computer Society, ANSI/IEEE Std 802.1D (1998).

IEEE Standards for Local and Metropolitan Area Networks: Virtual Bridged Local Area Networks, The Institute of Electrical and Electronics Engineers, IEEE Std 802.1Q-1998 (Mar. 8, 1999).

International Emergency Preference Scheme (IEPS), http://www.iepscheme.net/, Jun. 16, 2000, pp. 1-2.

International Telecommunication Union; "General Aspects of Digital Transmission Systems: Coding of Speech at 8kbits/s Using Conjugate-Structure Algebraic-Code-Excited Linear-Prediction" (CS-ACELP) ITU-T Recommendation G.729 (Mar. 1996).

ITU, "Packet-based multimedia communications systems", H. 323, Feb. 1998, 125 pages.

J. Heinanen et al., "Assured Forwarding PHB Group," Network Working Group, Category: Standards Track (Jun. 1999).

K. Nichols, Cisco Systems, RFC 2474, Definition of Differentiated Services Field in IPv4 & IPv6 Headers, Dec. 1998.

Kathy Lynn Hewitt, Desktop Video Conferencing; A Low Cost and Scalable Solution to Distance Education, "Chapter 2—Internet Conferencing Protocols"thesis submitted to North Carolina State University (1997), at http://www2.ncsu.edu/eos/service/ece/project/succeed_info/klhewitt/thesis/toc.html.

McCloghrie et al., "Structure of Policy Provisioning Information (SPPI)", RFC 3159, Aug. 2001, 38 pages.

PacketCable, Cable Labs, http://www.packetcable.com, copyright 2000-2002.

PacketCableTM Dynamic Quality-of-Service Specification PKT-SP-DQOS-102-000818, 2000, Cable Television Laboratories, Inc., 211 pages.

Paul Roller Michaelis, "Speech Digitization and Compression", Int'l Encyclopedia of Ergonomic and Human Factors (W. Warkowski ed., Taylor & Francis 2001).

Peter Parnes, "Real-time Transfer Protocol (RTP)" (Sep. 8, 1997), at www.cdt.luth.se/~peppar/docs/lic/html/nodel66.html.

S. Blake et al., "An Architecture for Differentiated Services," Network Working Group, Category: Informational (Dec. 1998).

Sangeun Han et al.,"Transmitting Scalable Video over a DiffServ network," EE368C Project Proposal (Jan. 30, 2001).

Schulzrinne. Providing Emergency Call Services for SIP-based Internet Telephony, http//www.softarmor.com/sipping/drafts/draft-schulzrinne-sip-911-00.txt., Jul. 13, 2000, pp. 1-13.

V. Jacobson et al., "An Expedited Forwarding PHB," Network Working Group, Category: Standards Track (Jun. 1999).

Wroclawski, "The use of RSVP with IETF Integrated Services", RFC 2210, Sep. 1997, 31 pages.

"Packet Loss and Packet Loss Concealment Technical Brief," Nortel Networks at http://www.nortelnetworks.com (2000).

"Telogy Networks' Voice Over Packet White Paper," Telogy Networks, Inc., available at http://www.telogy.com/our_products/golden_gateway/VOPwhite.html (Jan. 1998).

"Voice over packet: An assessment of voice performance on packet networks white paper," Nortel Networks, Publication No. 74007.25/09-01, at http://www.nortelnetworks.com (2001).

* cited by examiner

REAL TIME CONTROL PROTOCOL SESSION MATCHING

FIELD OF THE INVENTION

The present invention relates generally to network media streams and particularly to monitoring network media streams.

BACKGROUND OF THE INVENTION

Real Time Transfer Protocol ("RTP") is the standard protocol defining the real-time transmission of media streams (e.g., voice) over data networks, such as in Voice Over IP. A companion protocol to RTP is the Real Time Control Protocol or RTCP. Referring to FIG. 1, media packets transmitted between A 100 and B 104 and vice versa during a session are formatted and transmitted (continuously) over network 108 according to RTP while additional performance information governing the communication link (e.g., key statistics about the media packets being sent and received by each endpoint (A or B) such as jitter, packet loss, round-trip time, etc.) are transmitted (discontinuously) over the network 108 according to RTCP. Endpoints A and B are typically computational components but can be or include any other form of audio or video communications interface. RTCP performance information is useful not only for the session participants, A and B, but also for a network monitor 112. Network administrators can use such information not only for network administration but also for network troubleshooting and management.

RTCP is specifically designed to provide such information to the network monitor 112 via an IP multicast architecture. In IP multicast, a single packet is transmitted to a group of recipients by first being sent to a multicast address and then being distributed by the network to multiple addresses associated with the multicast address. The group of recipients includes not only the other (receiving) party in the session, namely A or B as appropriate, but also the monitor. When IP multicast is used for RTCP information, it also should be used for RTP information. Timing calculations for RTP packets are made based on the behavior of RTCP packets, and such timing calculations are only an accurate predictor of RTP packet transmission characteristics if both RTP and RTCP packets are transmitted by IP multicast techniques. IP multicast is generally disfavored because multicast is complicated which causes administration complications and difficulties.

A common architecture for transmitting media streams between two session participants is known as unicast. In unicast, the packets are transmitted to only one and not multiple destinations. It is more difficult for the monitor to collect and analyze RTCP packets as the packets are transmitted only to the other session participant and not to the monitor.

To enable the monitor to obtain RTCP packets, a dual unicast architecture has been developed. In dual unicast, one session participant (A) transmits both RTP and RTCP packets to the other session participant (B) and RTCP packets to the monitor. Dual unicast, however, exposes design limitations in the RTCP protocol itself. Although endpoint session ids are unique to a particular (first) session (such as between A and B), an endpoint in a concurrent (second) session (such as between C and D) can have the same session id or synchronization source id ("SSRC") as an endpoint (A or B) in the other (first) session. When duplicate endpoint session ids are concurrently in use, the monitor can have substantial difficulty determining which RTCP packets correspond to which session, potentially causing inaccurate performance analysis.

By way of illustration, in the example above assume that A sends an RTCP packet addressed to B and an RTCP packet addressed to the monitor. The RTCP packet addressed to the monitor includes A's transport address, A's SSRC, and B's SSRC but does not include the transport address of B. Likewise, C sends an RTCP packet addressed to D and an RTCP packet addressed to the monitor. The RTCP packet addressed to the monitor includes C's transport address, C's SSRC, and D's SSRC but does not include the transport address of D. If B and D have the same SSRC, the monitor is unable to definitively determine that a selected RTCP packet sent to either B or D corresponds to the A-B session or the C-D session.

SUMMARY OF THE INVENTION

These and other needs are addressed by the various embodiments and configurations of the present invention. The present invention generally matches or associates session packets communicated in a session between two or more endpoints or participants with the identities of the participants, e.g., session ids (e.g., SSRC) and/or network addresses (e.g., transport addresses), creating new sessions if appropriate. Each session participant is typically identified by network address (e.g., UDP port and Internet Protocol address) and/or session (e.g., SSRC).

In one embodiment, a method for identifying a corresponding session for a packet is provided that includes the steps of:

(a) receiving at least a first packet communicated between first and second endpoints (or participants) to a first session, the first packet comprising at least one of a network address of the first endpoint (e.g., port or UDP), a session id of the first endpoint (e.g. SSRC), and a session id of the second endpoint;

(b) comparing the at least one of a network address of the first endpoint, a session id of the first endpoint, and a session id of the second endpoint in the packet with a listing of at least one of network addresses and session ids contained in previously received packets; and (c) when the at least one of a network address of the first endpoint, a session id of the first endpoint, and a session id of the second endpoint in the packet matches an entry in the listing, determining a network address of the second endpoint in the first session (which is typically unknown).

The listing can be a single table or a plurality of tables. In one configuration, the listing is in the form of or includes an active session table, which includes the network addresses of all of the participants of a selected session and optionally the session ids of all of the selected session participants. In one configuration, the listing is in the form of or includes an orphan session table, which includes, in each entry, the network address of one (but not the other) session participant and optionally the session ids of one or both participants. The active and orphan session tables are typically disjoint.

In another embodiment, a method for monitoring a multiparty session is provided that includes the steps of:

(a) receiving, at a first endpoint, at least a first packet communicated between the first endpoint and a second endpoint to a first session, the first packet comprising a network address of the first endpoint and a network address of the second endpoint; and (b) transmitting at least a second packet to a session monitor, the second packet including the respective first and second network addresses of the first and second endpoints. In one configuration, the first packet is effectively retransmitted or reflected by the receiving first endpoint to the session monitor. This is particularly useful to third-party endpoints that do not implement dual-unicast.

In yet another embodiment, a session (e.g., RTP or RTCP) packet for transmission on a network, comprises:
 a source network address of a first participant to a session;
 a destination network address associated with a session monitor;
 a network address of a second participant to the session; and
 session information associated with the session.

In RTCP applications, the session packet can further include a first session id associated with the first participant and a second session id associated with the second participant. The network address of the second participant is typically located in the application or APP field of the RTCP packet.

In other embodiments, the systems and hardware are provided to implement the above embodiments.

The various embodiments of the present invention can have numerous advantages. For example, the window of opportunity for confusing concurrent sessions and attributing data in RTCP packets to the wrong session can be much smaller than with current architectures. The window of opportunity for possible confusion using the above algorithm(s) exists only when two different endpoints join different sessions at the same time and with the same SSRCs. This window of opportunity or startup interval closes once either of the endpoints (or their peers) has sent an RTCP packet with a reception block corresponding to either endpoint. Once the reception block is exchanged, the SSRCs of both parties to the session are known to the monitor. Before such an exchange, the monitor typically has only the SSRC and network address of one party to the session. The SSRC and network address of the other party is unknown. The startup interval is typically fairly short, e.g., typically on the order of 5 seconds or less. Even this potential period of confusion can be eliminated by choosing an SSRC for each endpoint that is globally unique. The use of the active session table and network address to define the session (rather than only pairings of SSRCs) can, after the startup interval, at least substantially eliminate misinterpretation of RTCP packets and incorrect analysis of performance data. The accuracy of the algorithm(s) in matching RTCP packets with the corresponding session results in more accurate statistical analysis of the communication link in the network.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The Monitor

Figure 3:
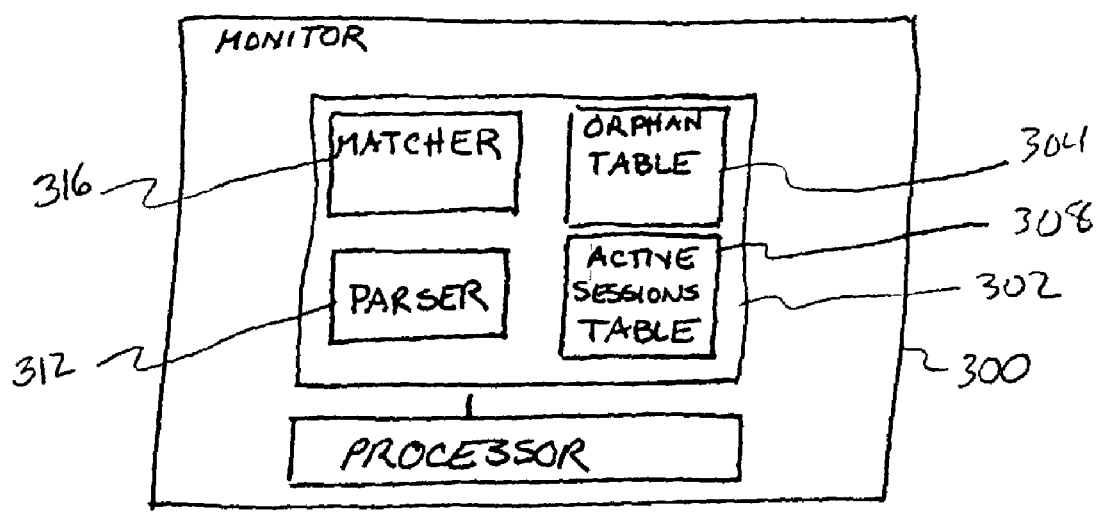
FIG. 3 is a block diagram of a monitor according to an embodiment of the present invention.

The monitor of the present invention, in one embodiment, includes data structures and applications to track multiple concurrent sessions. Referring to FIG. 3, the monitor 300 includes in memory 302 an orphan table 304 containing, inter alia, a listing of unmatched session endpoints or orphans, an active session table 308 containing, inter alia, a listing of matched session endpoints, a parser 304 to parse RTCP packets and locate selected fields, and a matcher 308 to compare selected fields in the packet with selected fields in the orphan and active session tables 304, 308.

The orphan table 304 typically includes, for each known endpoint, transport address of a first endpoint in a selected session, SSRC of the first endpoint, optionally SSRC of a second endpoint in the selected session, and associated data structures in the RTCP packet, such as jitter, packet loss, and round-trip time, related to the selected session. The network address of the second endpoint is unknown. The SSRC of the second (unknown) endpoint is typically contained in a reception report of the RTCP packet. The SSRC of the second endpoint is generally unavailable in the first RTCP packet received by the monitor from an endpoint in a session. The SSRC of the second endpoint is commonly generated only after one session participant receives an initial packet from the other session packet (or after packets have been exchanged by the session participants).

The active session table 308 typically includes, for each known or matched session, transport address of a first endpoint in a selected session, optionally SSRC of the first endpoint, network address of a second endpoint in the selected session, optionally SSRC of the second endpoint, and associated data structures in the RTCP packet, such as jitter, packet loss, and round-trip time, associated with the selected session. As will be appreciated, the entry in the orphan table in which the network address of the first endpoint is known is moved to the active session table when the monitor is able to identify the network address of the second (unknown) endpoint. As discussed below, this is typically determined by matching information in a newly received RTCP packet with one or more entries in the orphan table.

Operations of the Matching Algorithms

Figure 1:
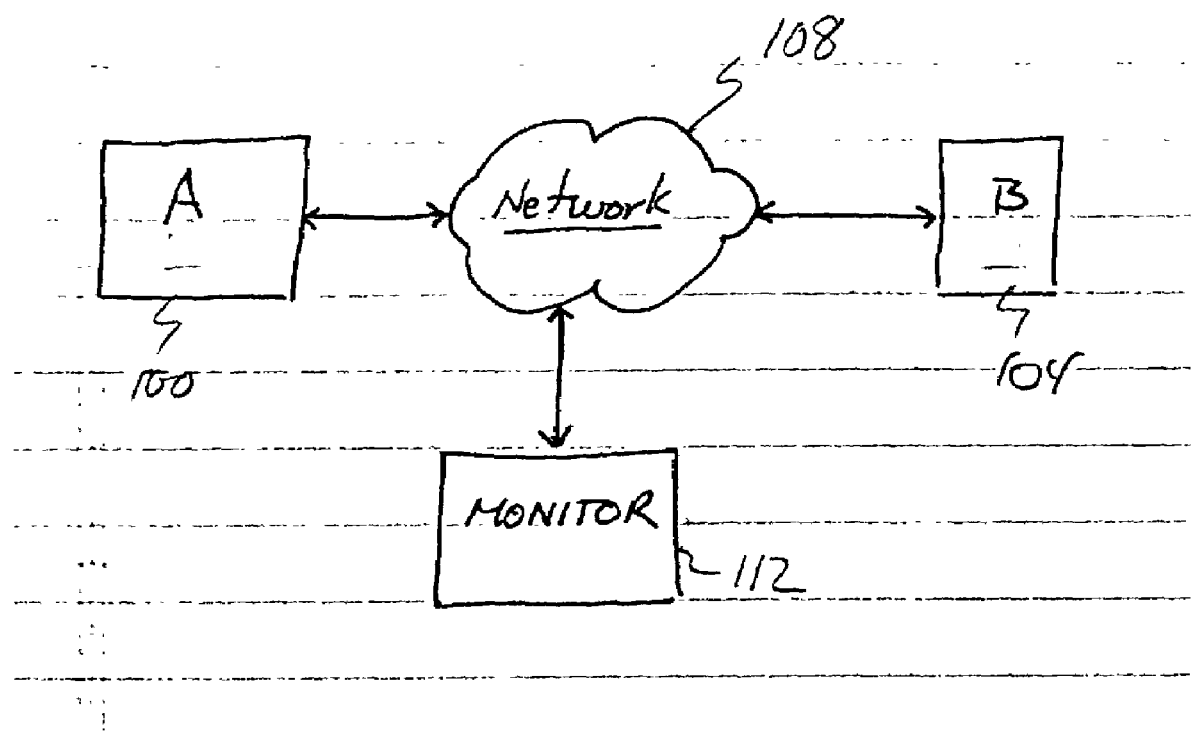
FIG. 1 is a block diagram of a session.
Figure 2:
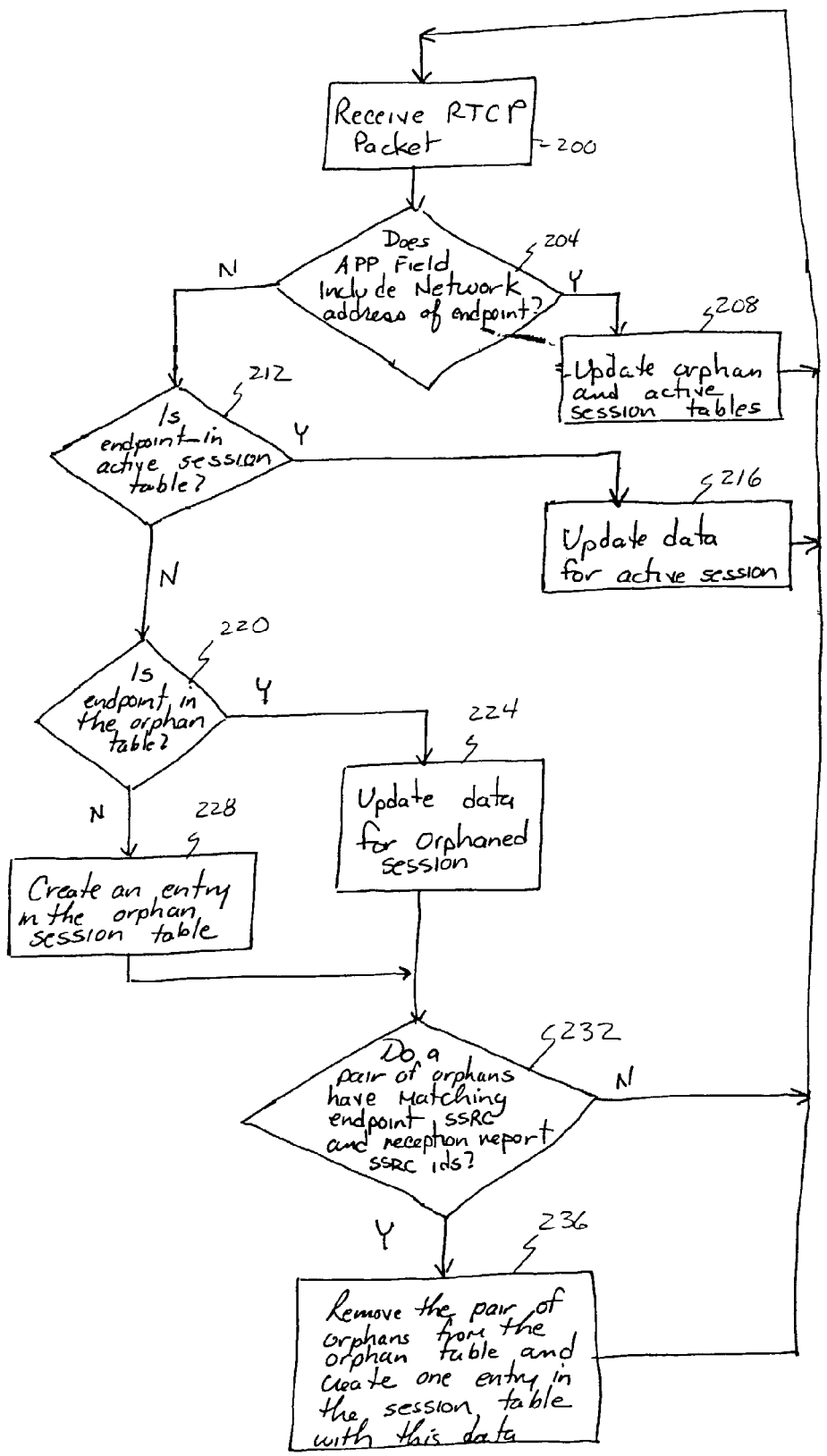
FIG. 2 is a flowchart depicting an algorithm according to an embodiment of the present invention.

The operations of the matching algorithm(s) in the monitor 300 will now be discussed with reference to FIG. 2. Referring to FIG. 2, a packet is received by the monitor in step 200. Parser 312 parses the packet to locate selected fields, which typically are the source transport address, source SSRC ("the endpoint SSRC"), if present the destination transport address of the other session participant (which is possibly in the application APP field), and, if present, the destination SSRC of the other session participant in the receiver report blocks (the SSRC's in the receiver report blocks are hereinafter referred to as the "reception report SSRC"). As will be appreciated, the reception report is typically a report regarding the characteristics of the communication link, such as the condition of the voice stream experienced since the last reception report.

In step 204, the matcher 316 first determines whether the APP field includes the destination transport address. If the APP field contains the destination transport address, the matcher 316 in step 208 updates the orphan and active tables. The orphan table can contain an entry corresponding to a first session participant where the first participant is not configured to place the transport address of the other (second) party in the APP field. In other configurations, however, the first packet received is from a party that is configured to include the destination transport address of the other session participant in the APP field and no entry will be made in the orphan table as the packet itself contains the transport addresses of both session participants. In any event, the matcher 316 removes the entry, if any, from the orphan table and, if necessary, creates a new entry in the active session table for the session. If an entry is already in the active session table, the entry is updated in step 208 by updating the associated data fields with the performance information included in the packet. The monitor 300 then returns to step 300 to await the next RTCP packet.

If the APP field does not include a transport address, the monitor 300 next proceeds to step 212 where the matcher 316 determines whether the source identified in the packet corresponds to an endpoint in the active session table. Matcher 316 makes this determination by matching on transport address or UDP and endpoint SSRC pair.

If the matcher 316 receives a hit (or match), the matcher 316, in step 216, updates the fields in the active session table and returns to step 200. As noted, each entry in the active session table includes at least endpoint pairs (identified by transport address, UDP and/or endpoint SSRC's).

If the matcher 316 receives a no hit (or no match), the matcher 316, in step 220, determines if the source or endpoint in the packet has a matching entry in the orphan table. This is typically determined by matching on transport address or UDP and endpoint SSRC pair.

If the matcher 316 receives a hit, the monitor in step 224 updates the entry for the orphan session. This is typically done by updating the other party's SSRC (if available) and updating the associated data in the packet. As noted, each entry in the orphan session table includes at least UDP or transport address of an endpoint, an endpoint SSRC, and optionally reception report SSRC.

If the matcher 316 receives a no hit, the matcher 316 in step 228 creates an entry (if necessary) in the orphan session table 304.

After both steps 224 and 228, the monitor 300 next determines in step 232 whether a pair of entries corresponding to a pair of orphans have matching endpoint SSRC and reception report SSRC's. If no match is found, the monitor proceeds to step 200 to await the next packet. If a match is found, the monitor in step removes the matched end-point entries from the orphan table and creates one entry in the active session table with the data in the two entries in corresponding fields. The monitor then returns to step 200 to await the next packet.

Figure 4:
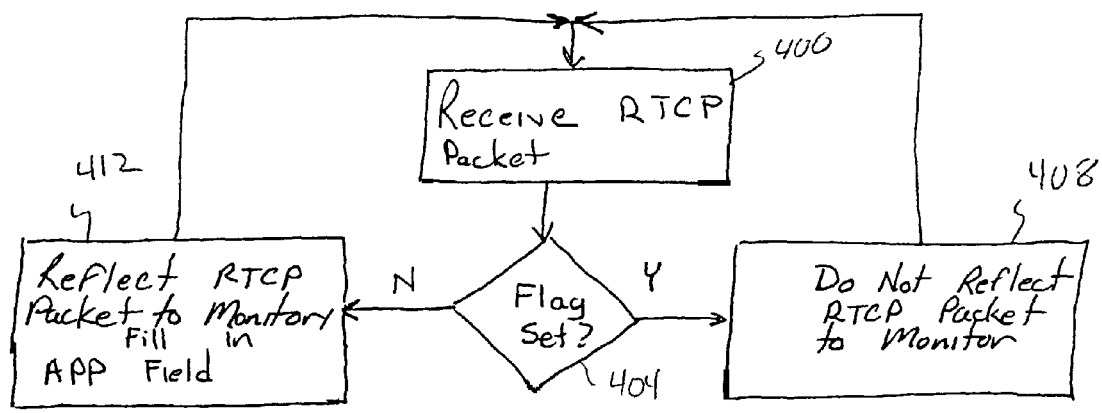
FIG. 4 is a flowchart depicting an algorithm according to an embodiment of the present invention.

FIG. 4 depicts the algorithm for a computational component in the first endpoint that is configured to input another (second) endpoint's SSRC into the APP field. In step 400, the first endpoint receives an RTCP packet from the second endpoint participating in a session with the first endpoint. In step 404, the first endpoint parses the RTCP packet and determines whether a flag has been set (i.e., determines the flag's value). The flag identifies whether or not the second endpoint is configured to transmit a duplicate packet to the session monitor. If the flag is set (meaning that the second endpoint is configured to transmit a duplicate packet to the session monitor), the first endpoint in step 408 does not forward a modified version of the RTCP packet to the monitor. The first endpoint returns to step 400 to await the next RTCP packet. If the flag is not set (meaning that the second endpoint is not configured to send a duplicate RTCP packet to the monitor), the first endpoint in step 412 modifies the RTCP packet by replacing the destination address with that of the monitor and inputs into the APP field the second endpoint's network address and forwards the modified packed to the monitor 300. The forwarding can be done by any suitable technique such as port forwarding.

A number of variations and modifications of the invention can be used. It would be possible to provide for some features of the invention without providing others. For example in one alternative embodiment, the algorithm is used for protocols besides RTP and/or RTCP. In another alternative embodiment, steps 200, 204, and 208 are used alone to match session endpoints with RTCP packets. This embodiment is useful where both endpoints to a session input into the APP field the transport address of the other party to the session. In another embodiment, steps 212, 216, 220, 224, 228, 232, and 236 are used independently to match session endpoints with RTCP packets. This embodiment is useful where neither endpoint to a session inputs into the APP field the transport address of the other party. In yet another embodiment, the algorithm(s) is useful for other network topologies. For example, the algorithm(s) can be used with a unicast architecture where a packet redirector or copier such as a sniffer, probe, or router is positioned between the two parties to the session to intercept RTCP packets and either send a copy of the packet or the packet itself to the monitor. In yet another embodiment, the orphan and active session tables can be combined into one table, with a flag or other indicator being used to indicate when an entry has been completed (i.e., both endpoints to the session have been identified by transport address).

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for identifying a corresponding session for a packet, comprising:
   (a) in a first session, a first endpoint transmitting first and second sets of packets, respectively, to a session monitor and a second endpoint, wherein the first and second sets of packets have differing information, wherein each packet in the first set of packets is used for determining network performance information, and wherein each of the first and second endpoints has an associated electronic address on a network and a session identifier;
   (b) the session monitor receiving at least a first packet in the first packet set, the first packet comprising at least the network address and session identifier associated with the first endpoint;
   (c) determining whether at least one of the first endpoint's network address and session identifier correspond to an active session entry recorded in a first set of data structures, the first set of data structures comprising active session entries, each entry in the first set of data structures having at least network addresses for each of the endpoints to the corresponding session;

(d) when at least one of the first endpoint's network address and session identifier correspond to an active session entry in the first set of data structures, updating the corresponding entry to include the network performance information associated with the at least a first packet;

(e) determining whether at least one of the first endpoint's network address and session identifier correspond to an active session entry recorded in a second set of data structures, the second set of data structures having active session entries, each of the entries in the second set of data structures failing to comprise network addresses for each of the endpoints to the corresponding session; and (f) when at least one of the first endpoint's network address and session identifier correspond to an active session entry in the second set of data structures, updating the entry to include the performance information associated with the at least a first packet.

2. The method of claim 1, wherein at least some of the packets in the second set of packets comprise media information associated with the first session, and wherein, in steps (c) and (e), a corresponding entry is identified using the network address and session identifier of the first endpoint.

3. The method of claim 1, wherein step (e) is performed when the at least one of the first endpoint's network address and session identifier fail to correspond to an entry in the first set of data structures, wherein the electronic network address is at least one of a port and transport address, and further comprising before the determining step (c):

(b1) parsing the at least a first packet for at least one selected field; and (b2) determining whether the network address of the second endpoint is in the selected field, wherein, when the network address of the second endpoint is in the selected field, steps (e)-(f) are not performed and, when the network address of the second endpoint is not in the selected field, steps (e)-(f) are performed.

4. The method of claim 1, wherein the network performance information comprises statistics about the media packets in the second set of packets and further comprising:

(g) determining whether a pair of session entries in the second set of data structures pertain to a common session; and (h) when the second set of data structures includes a pair of session entries pertaining to a common session, removing the pair of entries from the second set of data structures and adding the pair of session entries to a common session entry in the first set of data structures.

5. The method of claim 1, wherein, when the at least one of the first endpoint's network address and session identifier are not in the first and second sets of data structures, the at least one of the first endpoint's network address and session identifier is added to the second set of data structures.

6. The method of claim 1, wherein the packets in the first set of packets are defined by the Real Time Transfer Control Protocol, wherein the packets in the second set of packets are defined by one of the Real Time Transfer Control Protocol and the Real Time Protocol, wherein the performance information comprise statistics respecting at least one of jitter, packet loss, and round-trip time, wherein step (b) comprises the substeps:

(b1) parsing the at least a first packet to locate selected fields comprising the transport address of the sending endpoint, the session identifier of the sending endpoint, the transport address of the destination endpoint, and the session identifier of the destination endpoint, wherein the first endpoint is the source endpoint and the second endpoint is the destination;

(b2) when the at least a first packet comprises the network address of the second endpoint, updating a set of data structures to include the second endpoint's network address; and (b3) when the at least a first packet does not comprise the network address of the second endpoint, updating a corresponding entry in one of the first and second sets of data structures.

7. The method of claim 1, wherein steps (d) and (e) are not performed when the at least a first packet includes the network address of the second endpoint and wherein the session monitor performs steps (c) and (e).

8. A computer readable medium comprising processor executable instructions to perform the steps of claim 1.

9. The method of claim 2, wherein the first set of data structures comprises, for each active session, a transport address of each of the endpoints participating in the session, the session identifiers for each of the endpoints participating in the session, and performance information corresponding to packets exchanged in the session, wherein the second set of data structures comprises, for each active session, a transport address of at least one of the endpoints participating in the session, a session identifier for at least one but less than all of the endpoints participating in the session, and performance information corresponding to packets exchanged in the session, and wherein the performance information comprises at least one of jitter, packet loss, and packet round-trip time, wherein the media information comprises voice data, and wherein the packets in the first set of packets do not contain media information.

10. In a network, the network comprising:

(i) a session monitor operable to track network performance for a plurality of sessions; and (ii) first endpoint and second endpoints, the first endpoint being operable to transmit first and second sets of packets, respectively, to the session monitor and the second endpoint, wherein the first and second sets of packets have differing information, wherein each packet in the first set of packets is used by the session monitor to determine network performance information, and wherein each of the first and second endpoints has an associated electronic address on a network and a session identifier, the session monitor comprising:

(a) an input operable to receive at least a first packet in the first packet set, the first packet comprising at least the network address and session identifier associated with the first endpoint; and (b) a matcher operable to:

(b1) determine whether at least one of the first endpoint's network address and session identifier correspond to an active session entry recorded in a first set of data structures, the first set of data structures comprising active session entries, each entry in the first set of data structures having at least network addresses for each of the endpoints to the corresponding session;

(b2) when at least one of the first endpoint's network address and session identifier correspond to an active session entry in the first set of data structures, update the corresponding entry to include the performance information associated with the at least a first packet;

(b3) determine whether at least one of the first endpoint's network address and session identifier correspond to an active session entry recorded in a second set of data structures, the second set of data structures having active session entries, each of the entries in the second set of data structures failing to comprise network addresses for each of the endpoints to the corresponding session; and (b4) when at least one of the first endpoint's network address and session identifier correspond to an active session entry in the second set of data structures, update the entry to include the performance information associated with the at least a first packet.

11. The session monitor of claim 10, wherein at least some of the packets in the second set of packets comprise media information associated with the first session, and wherein, in operations (b1) and (b3), a corresponding entry is identified using the network address and session identifier of the first endpoint.

12. The session monitor of claim 10, wherein operation (b3) is performed when the at least one of the first endpoint's network address and session identifier fail to correspond to an entry in the first set of data structures, wherein the electronic network address is at least one of a port and transport address, and further comprising:

(c) a parser operable to parse the at least a first packet for at least one selected field and determine whether the network address of the second endpoint is in the selected field, wherein, when the network address of the second endpoint is in the selected field, operations (b1)-(b4) are not performed and, when the network address of the second endpoint is not in the selected field, operations (b1)-(b4) are performed.

13. The session monitor of claim 10, wherein the network performance information comprises statistics about the media packets in the second set of packets and wherein the session monitor is further operable to:

(b5) determine whether a pair of session entries in the second set of data structures pertain to a common session; and (b6) when the second set of data structures includes a pair of session entries pertaining to a common session, remove the pair of entries from the second set of data structures and adding the pair of session entries to a common session entry in the first set of data structures.

14. The session monitor of claim 10, wherein, when the at least one of the first endpoint's network address and session identifier are not in the first and second sets of data structures, the at least one of the first endpoint's network address and session identifier is added to the second set of data structures.

15. The session monitor of claim 10, wherein the packets in the first set of packets are defined by the Real Time Transfer Control Protocol, wherein the packets in the second set of packets are defined by one of the Real Time Transfer Control Protocol and the Real Time Protocol, wherein the performance information comprise statistics respecting at least one of jitter, packet loss, and round-trip time, and further comprising:

(c) a parser operable to parse the at least a first packet to locate selected fields comprising the transport address of the sending endpoint, the session identifier of the sending endpoint, the transport address of the destination endpoint, and the session identifier of the destination endpoint, wherein the first endpoint is the source endpoint and the second endpoint is the destination and wherein the session monitor is further operable to:

(b5) when the at least a first packet comprises the network address of the second endpoint, update a set of data structures to include the second endpoint's network address; and (b6) when the at least a first packet does not comprise the network address of the second endpoint, update a corresponding entry in one of the first and second sets of data structures.

16. The session monitor of claim 10, wherein operations (b3) and (b4) are not performed when the at least a first packet includes the network address of the second endpoint.

17. The session monitor of claim 11, wherein the first set of data structures comprises, for each active session, a transport address of each of the endpoints participating in the session, the session identifiers for each of the endpoints participating in the session, and performance information corresponding to packets exchanged in the session, wherein the second set of data structures comprises, for each active session, a transport address of at least one of the endpoints participating in the session, a session identifier for at least one but less than all of the endpoints participating in the session, and performance information corresponding to packets exchanged in the session, and wherein the performance information comprises at least one of jitter, packet loss, and packet round-trip time, wherein the media information comprises voice data, and wherein the packets in the first set of packets do not contain media information.

18. In a network, the network comprising:

(i) a session monitor operable to track network performance for a plurality of sessions and maintain first and second sets of data structures having active Voice over Internet Protocol (VoIP) session entries, the first set of data structures comprising, for each active session entry in the first set of data structures, electronic addresses for each of the endpoints involved in the VoIP session identified in the respective session entry, and the second set of data structures comprising, for each active VoIP session entry in the second set of data structures, each of the entries in the second set of data structures failing to comprise addresses for each of the endpoints to the corresponding session;

(ii) first endpoint and second endpoints, the first endpoint being operable to transmit first and second sets of packets, respectively, to the session monitor and the second endpoint, wherein the first and second sets of packets have differing information, wherein each packet in the first set of packets is used by the session monitor to determine network performance information, and wherein each of the first and second endpoints has an associated electronic address on a network and a session identifier, a method comprising:

(a) the first endpoint receiving at least a first packet communicated between the first and second endpoints to the first session, the first packet comprising the electronic address of the first endpoint on the network, the electronic address of the second endpoint on the network, and voice information, and being associated with the second packet set;

(b) the first endpoint transmitting at least a second packet to the session monitor, the at least a second packet including the respective first and second addresses of the first and second endpoints and being associated with the first packet set, wherein the first session has an entry in the second set of data structures and wherein, based on the at least a second packet, the session monitor determines the electronic addresses for both the first and second endpoints, updates the corresponding entry in the second set of data structures, and moves the entry from the second to the first set of data structures;

(c) the session monitor receiving at least a second packet, the second packet comprising a session identifier associated with the first endpoint;

(d) determining whether at least one of the first endpoint's network address and session identifier corresponds to an active session entry recorded in the first set of data structures;

(e) when at least one of the first endpoint's address and session identifier correspond to an active session entry in the first set of data structures, updating the corresponding entry to include the network performance information associated with the at least a second packet;

(f) determining whether at least one of the first endpoint's address and session identifier correspond to an active session entry recorded in the second set of data structures; and (g) when at least one of the first endpoint's address and session identifier correspond to an active session entry in the second set of data structures, updating the entry to include the performance information associated with the at least a second packet.

19. The method of claim 18, wherein step (a) comprises the substep:

(a1) determining a value of a flag in the at least a first packet;

and wherein, when the flag has a first predetermined value, performing step (b) and, when the flag has a second predetermined value, not performing step (b).

20. In a network, the network comprising:

(i) a session monitor operable to track network performance for a plurality of sessions; and (ii) first endpoint and second endpoints, the first endpoint being operable to transmit first and second sets of packets, respectively, to the session monitor and the second endpoint, wherein the first and second sets of packets have differing information, wherein each packet in the first set of packets is used by the session monitor to determine network performance information, and wherein each of the first and second endpoints has an associated electronic address on a network and a session identifier, the first endpoint comprising:

(ia) an input operable to receive at least a first packet communicated between the first and second endpoints to a first session, the first packet comprising an address of the first endpoint, an address of the second endpoint, and voice information, and being associated with the second packet set; and (ib) a transmitter operable to transmit at least a second packet to a session monitor, the at least a second packet including the respective first and second addresses of the first and second endpoints and being associated with the first packet set and the session monitor comprising:

(iia) an input operable to receive at least a second packet in the first packet set, the second packet comprising at least the network address and session identifier associated with the first endpoint; and (iib) a matcher operable to:

(b1) determine whether at least one of the first endpoint's address and session identifier correspond to an active session entry recorded in a first set of data structures, the first set of data structures comprising active session entries, each entry in the first set of data structures having at least addresses for each of the endpoints to the corresponding session;

(b2) when at least one of the first endpoint's address and session identifier correspond to an active session entry in the first set of data structures, update the corresponding entry to include the performance information associated with the at least a second packet;

(b3) determine whether at least one of the first endpoint's address and session identifier correspond to an active session entry recorded in a second set of data structures, the second set of data structures having active session entries, each of the entries in the second set of data structures failing to comprise addresses for each of the endpoints to the corresponding session; and (b4) when at least one of the first endpoint's network address and session identifier correspond to an active session entry in the second set of data structures, update the entry to include the performance information associated with the at least a second packet.

21. The network of claim 20, wherein the first packet includes a flag and wherein, when the flag has a first predetermined value, the transmitter transmits the at least a second packet and, when the flag has a second predetermined value, the transmitter does not transmit the at least a second packet.

22. In a network, the network comprising:

(i) a session monitor operable to track network performance for a plurality of Voice over Internet Protocol (VoIP) sessions; and (ii) first endpoint and second endpoints, the first endpoint being operable to transmit first and second sets of packets, respectively, to the session monitor and the second endpoint, wherein the first and second sets of packets have differing information, wherein each packet in the first set of packets is used by the session monitor to determine network performance information, and wherein each of the first and second endpoints has an associated electronic address on a network and a session identifier, the session monitor comprising:

(a) an input operable to receive at least a first packet in the first packet set, the first packet comprising at least the electronic address and session identifier associated with the first endpoint; and (b) a matcher operable to:

(b1) determine whether at least one of the first endpoint's electronic address and session identifier correspond to an active session entry recorded in a first set of data structures, the first set of data structures comprising active session entries, each entry in the first set of data structures having at least electronic addresses for each of the endpoints to the corresponding session;

(b2) when at least one of the first endpoint's electronic address and session identifier correspond to an active session entry in the first set of data structures, update the corresponding entry to include the performance information associated with the at least a first packet;

(b3) determine whether at least one of the first endpoint's electronic address and session identifier correspond to an active session entry recorded in a second set of data structures, the second set of data structures having active session entries, each of the entries in the second set of data structures failing to comprise electronic addresses for each of the endpoints to the corresponding session; and (b4) when at least one of the first endpoint's electronic address and session identifier correspond to an active session entry in the second set of data structures, update the entry to include the performance information associated with the at least a first packet.

23. The session monitor of claim 22, wherein at least some of the packets in the second set of packets comprise media information associated with the first session, and wherein, in operations (b1) and (b3), a corresponding entry is identified using the electronic address and session identifier of the first endpoint, wherein operation (b3) is performed when the at least one of the first endpoint's electronic address and session identifier fail to correspond to an entry in the first set of data structures, wherein the electronic address is at least one of a port and transport address, and further comprising:

(c) a parser operable to parse the at least a first packet for at least one selected field and determine whether the electronic address of the second endpoint is in the selected field, wherein, when the electronic address of the second endpoint is in the selected field, operations (b1)-(b4) are not performed and, when the electronic address of the second endpoint is not in the selected field, operations (b1)-(b4) are performed.

24. The session monitor of claim 22, wherein the network performance information comprises statistics about the media packets in the second set of packets and wherein the session monitor is further operable to:

(b5) determine whether a pair of session entries in the second set of data structures pertain to a common session; and (b6) when the second set of data structures includes a pair of session entries pertaining to a common session, remove the pair of entries from the second set of data structures and adding the pair of session entries to a common session entry in the first set of data structures, wherein, when the at least one of the first endpoint's electronic address and session identifier are not in the first and second sets of data structures, the at least one of the first endpoint's electronic address and session identifier is added to the second set of data structures, wherein the packets in the first set of packets are defined by the Real Time Transfer Control Protocol, wherein the packets in the second set of packets are defined by one of the Real Time Transfer Control Protocol and the Real Time Protocol, wherein the performance information comprise statistics respecting at least one of jitter, packet loss, and round-trip time, wherein the first set of data structures comprises, for each active session, a transport address of each of the endpoints participating in the session, the session identifiers for each of the endpoints participating in the session, and performance information corresponding to packets exchanged in the session, wherein the second set of data structures comprises, for each active session, a transport address of at least one of the endpoints participating in the session, a session identifier for at least one but less than all of the endpoints participating in the session, and performance information corresponding to packets exchanged in the session, and wherein the performance information comprises at least one of jitter, packet loss, and packet round-trip time, wherein the media information comprises voice data, and wherein the packets in the first set of packets do not contain media information.

* * * * *